US008763005B2

(12) United States Patent
Staelin et al.

(10) Patent No.: US 8,763,005 B2
(45) Date of Patent: Jun. 24, 2014

(54) VIRTUAL-MACHINE-BASED APPLICATION-SERVICE PROVISION OF FRONT-END VERSIONS OF BACK-END APPLICATIONS

(75) Inventors: Carl Staelin, Haifa (IL); Mani Fischer, Haifa (IL); Oren Ariel, Hod HaSharon (IL); Eli Mordechai, Modin (IL); Chen Finkelstein, Jahariya (IL); Nimrod Rod, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/259,590

(22) PCT Filed: Jul. 24, 2009

(86) PCT No.: PCT/US2009/051722
§ 371 (c)(1),
(2), (4) Date: Sep. 23, 2011

(87) PCT Pub. No.: WO2011/011016
PCT Pub. Date: Jan. 27, 2011

(65) Prior Publication Data
US 2012/0117565 A1 May 10, 2012

(51) Int. Cl.
*G06F 9/46* (2006.01)
*G06F 9/455* (2006.01)

(52) U.S. Cl.
USPC .......................................... 718/105; 718/104

(58) Field of Classification Search
None
See application file for complete search history.

(56) References Cited

U.S. PATENT DOCUMENTS

| 2005/0020234 A1* | 1/2005 | Iivari et al. ..................... 455/403 |
| 2006/0174159 A1* | 8/2006 | Borresen et al. ................ 714/13 |
| 2009/0089781 A1 | 4/2009 | Shingai et al. |
| 2009/0210527 A1* | 8/2009 | Kawato .......................... 709/224 |
| 2009/0210541 A1* | 8/2009 | Chandolu et al. ............. 709/229 |
| 2010/0318782 A1* | 12/2010 | Auradkar et al. ............. 713/150 |
| 2010/0322255 A1* | 12/2010 | Hao et al. ....................... 370/398 |

(Continued)

FOREIGN PATENT DOCUMENTS

| JP | 2007/213490 | 8/2007 |
| WO | 2007/002595 | 1/2007 |
| WO | 2008/005722 | 1/2008 |

OTHER PUBLICATIONS

International Search Report and Written Opinion dated Feb. 11, 2010 of PCT Patent Application No. PCT/US2009/051722 filed on Jul. 24, 2009.

(Continued)

*Primary Examiner* — Meng An
*Assistant Examiner* — Bradley Teets

(57) ABSTRACT

Embodiments of the present invention are directed to application-service provision by application-service-provider centers to remote application-service consumers, including small businesses, medium-sized businesses, and other similarly-sized institutions and organizations, as well as to users of individual computers, such as home computers. Rather than executing applications at an application-service-provider center, the applications are instead distributed to remote client sites for execution by virtual machines controlled and managed by an application-service-provider center. Execution of the applications by virtual machines at remote client sites alleviates constraints and bottlenecks associated with communications between client computers and remotely executing applications, while providing management capabilities and security that allow the application-service center to manage application execution as if the remotely executing applications were executing within the application-service center.

15 Claims, 9 Drawing Sheets

(56) References Cited

U.S. PATENT DOCUMENTS

2011/0251992 A1* 10/2011 Bethlehem et al. ........... 707/610
2012/0150992 A1* 6/2012 Mays et al. ................... 709/217
2012/0290455 A1* 11/2012 Mays .............................. 705/34

OTHER PUBLICATIONS

The Hague, Supplementary European Search Report, Sep. 12, 2013, 5 pages, Netherlands.

* cited by examiner

VIRTUAL-MACHINE-BASED APPLICATION-SERVICE PROVISION OF FRONT-END VERSIONS OF BACK-END APPLICATIONS

TECHNICAL FIELD

The present invention is related to application-service provision from application-service-provision centers to remote client sites and, in particular, to application-service provision through virtual machines provided by virtual-machine servers at remote customer sites.

BACKGROUND OF THE INVENTION

Perhaps no other field of technology in human history has evolved as quickly as electronic computing. Computers, computing environments, and computational services have evolved from primitive computer systems, controlled by programs input as stacks of Hollerith cards, which could execute only a single program at a given time, to complex, distributed, networked computing facilities that provide computing services to hundreds, thousands, or hundreds of thousands of concurrent users. As a result of the rapid and radical evolution of computer hardware, electronic communications, operating systems, and application programs, the methods by which computer systems are configured and managed have also evolved. Currently, the distribution of software and computational services, and the configuration and management of computers, servers, electronic communications networks, and other aspects of a computing environment, have become complex, time-consuming, human-resource-consuming, and expensive. Developers, manufacturers, vendors, and users of computers and computer systems continuously seek improved methods and systems for configuring and managing computers and computer systems, particularly in small and medium-sized businesses and other similarly-sized organizations.

DETAILED DESCRIPTION OF THE INVENTION

Embodiments of the present invention are directed to application-service provision by application-service-provider, centers to remote application-service consumers, including small businesses, medium-sized businesses, and other similarly-sized institutions and organizations, as well as to users of individual computers, such as home computers. Rather than executing applications at an application-service-provider center, the applications are instead distributed to remote client sites for execution by virtual machines controlled and managed by an application-service-provider center. Execution of the applications by virtual machines at remote client sites alleviates constraints and bottlenecks associated with communications between client computers and remotely executing applications, while providing management capabilities and security that allow the application-service center to manage application execution as if the remotely executing applications were executing within the application-service center. The application-services provision method and system of the present invention takes advantage of virtual-machines and virtual-machine-server technology, designed and implemented for various other purposes, to geographically virtualize an application-services-provision center to remote client sites.

Figure 1:
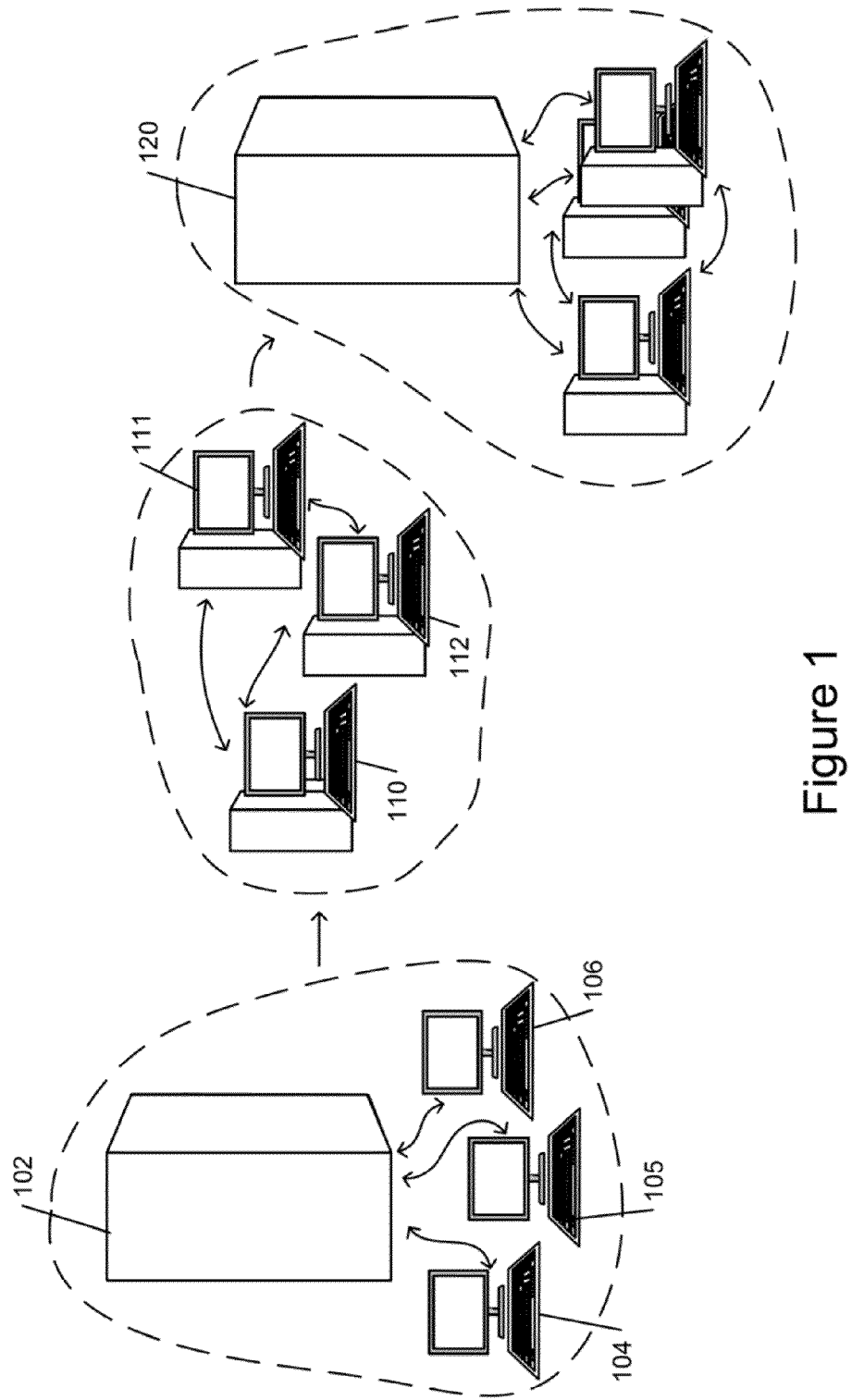
FIG. 1 illustrates a portion of the evolution of application-service provision.

FIG. 1 illustrates a portion of the evolution of application-service provision. In the earliest days of computing, a computer user would manually load a program, along with input data, to a stand-alone, single-user computer system for execution. In general, both the program and input data were encoded on Hollerith cards that were fed, in large stacks, into a card reader. Eventually, operating systems were developed to provide program-execution environments to multiple concurrent users. Development of multi-tasking operating systems and mini-computers led to widespread use of application services by computer users. In the 1970's and early 1980's, businesses and organizations generally employed one or a few mini-computers 102, furnished with multi-tasking operating systems, that executed application programs on behalf of multiple, concurrent users connected to the mini-computer through so-called "dumb" terminals 104-106. The terminals displayed alphanumeric text in a 24-line format, and the operating system provided a command-line interface that allowed users to execute selected programs, receive alphanumeric output from programs, and direct text output to line printers or teletype machines. All of the application programs were stored within, and executed by, the mini-computer, which was centrally managed within the organization or business. Application programs and other software were generally distributed on physical media, including various types of magnetic disks and tapes, to computer centers, where they were installed and configured by computer-center technicians. Centralized application-services provision was a natural model for computing as a result of the central location of the computer system and data-storage facilities as well as the lack of computational resources associated with user terminals.

In the mid-1980's, personal computers became widely available. The cost-performance benefits of personal computers quickly exceeded those of mini-computers, and the personal computers and workstations rapidly replaced centralized mini-computers and dumb terminals in many organizations. Development of reliable and inexpensive local area networks allowed the businesses and organizations to provide a networked personal computer or workstation 110-112 to each computer-using employee, allowing employees to locally execute application programs loaded on their personal computers and workstations, to communicate with one another, and to use various distributed applications via LAN communications systems. However, although highly cost effective and providing enormous increases in computational bandwidth, which facilitated development of high-resolution graphical windowing interfaces, networks of personal computer quickly gave rise to a new set of complex configuration, management, and security problems that were not previously encountered in centralized computing systems based on mini-computers and dumb terminals. With the advent of networked personal computers, application programs generally were installed on each personal computer by employees and, later, by information-technology ("IT") personnel. Rather than purchasing a single copy of an application program and installing it on a centralized mini-computer, businesses and organizations now purchase multiple copies of application programs, or application programs licensed for multiple installations, that needed to be installed on each of many personal computers within the organization or business. Initial configuration of the personal computers and ongoing maintenance and update of personal computer systems quickly became a time-consuming and expensive overhead for businesses and organizations. Furthermore, security problems rarely encountered in centralized computing environments quickly became critical issues. Users of personal computers often inadvertently acquired viruses and malware that could propagate throughout the networked systems and seriously compromise data security as well as computer operations. Thus, while hardware costs were lowered and computational bandwidth vastly increased by moving to personal computers and workstations, system administration tasks became, in general, more complex, costly, and time consuming.

Subsequently, high-end server computers and client-server protocols were developed to provide certain centralized services to client computers within organizations and businesses. To some degree, server computers and client-server protocols represent a partial recentralization of computational-service provision. Many high-end application programs are partitioned into back-end applications that run on servers and front-end applications that run on client computers, allowing partitioning of computing, data storage, and networking resources between personal computers and workstations and higher-bandwidth server computers. In addition, the server-client paradigm allowed for easier and more efficient implementation of various types of distributed applications, such as email services and database-management systems. Additionally, certain of the configuration and management tasks were simplified due to recentralization of computer-service provision within centrally located server computers.

Figure 2:
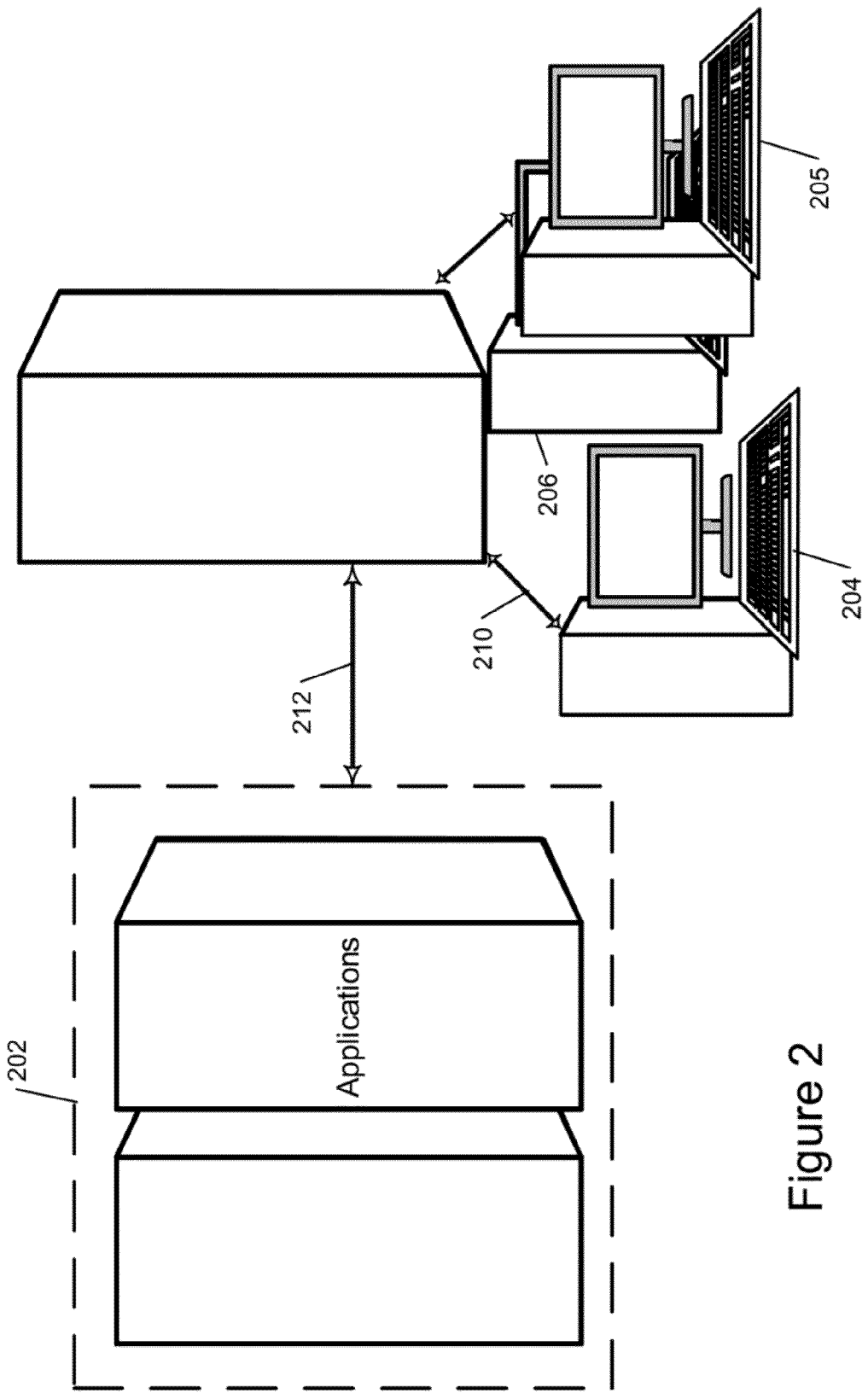
FIG. 2 illustrates the application-service-provider ("ASP") model.

FIG. 2 illustrates the application-service-provider ("ASP") model. In many ways, the ASP model represents an extension of the client-server model discussed above with reference to FIG. 1. In the ASP model, an application-service provider ("ASP") manages an application-services-provision center ("ASPC") 202 with high-end computational facilities on which application programs are run on behalf client sites, such as small business clients, medium-sized business clients; and similarly-sized organizational and institutional clients ("SMBCs"). At the remote client site, users on personal computers 204-206 access applications executed on their behalf by the application service provider via a local area network 210 and a wide area network 212, generally accessing executing applications via a web browser or special-purpose client software that executes on the client personal computers. As one example, employees within a small business may access and use credit-card-payment-processing services, billing services, high-end database-management services, computer-aided-design programs, and other such applications provided as a service, to the small business on a per-use or subscription basis.

The ASP model eliminates a great deal of the overhead associated with application-program execution within an SMBC site. The applications do not need to be installed, configured, and managed by the SMBC site. Expensive multi-seat licenses for complex application programs that may be used infrequently by employees are avoided. The application-service provider assumes responsibility for installation, configuration, management, and update of the application programs, and can leverage highly trained and expensive personnel over many SMBCs. Furthermore, the ASP can also leverage much more robust, reliable, and high-bandwidth computational systems over multiple SMBCs. Whereas many SMBCs may not be able to afford, for example, to purchase and maintain a geographically distributed computing and data-storage system, the ASP can provide such high-end systems and leverage the cost and management overheads over large numbers of SMBCs. Provision of application services according to the ASP model may also suffer various types of disadvantages that may be significant to particular SMBCs, including potential loss of control over critical data, higher security risks attendant with exchange of data between SMBC sites and ASPCs, and other such disadvantages. Nonetheless, the ASP model has grown increasingly popular for many SMBCs, and with increasing availability of high-bandwidth communications media, along with the increasing cost of specialized application programs and IT personnel, the ASP model is expected to gain an ever-increasing share of the computational-services marketplace.

Currently, certain constraints may limit the availability and usefulness of the ASP model for particular types of applications and particular types of ASP clients. One important constraint is the wide-area-network or other electronic-communications interconnection between ASPCs and remote SMBC sites. For applications that receive large amounts of data input and produce large amounts of data output, including graphical data, video data, and other such output, the ASP-to-client-site communications can be a severe bottleneck. Although communications bandwidths increase as communications technologies evolve, the input and output data volumes of many types of applications also tend to increase as application programs evolve. Furthermore, in many cases, the computational bandwidth available at remote SMBC sites may be underutilized, while the computational bandwidth at ASP service centers may be taxed by computationally intense application programs. The traditional ASP model does not provide a means for distributing the computational overhead between the ASPCs and remote SMBCs. For these reasons, ASPs, ASP clients, and developers and inventors of application programs all recognize the need for new technologies and methods for raising the level of services that can be provided by ASPCs to remote ASP clients.

Figure 3:
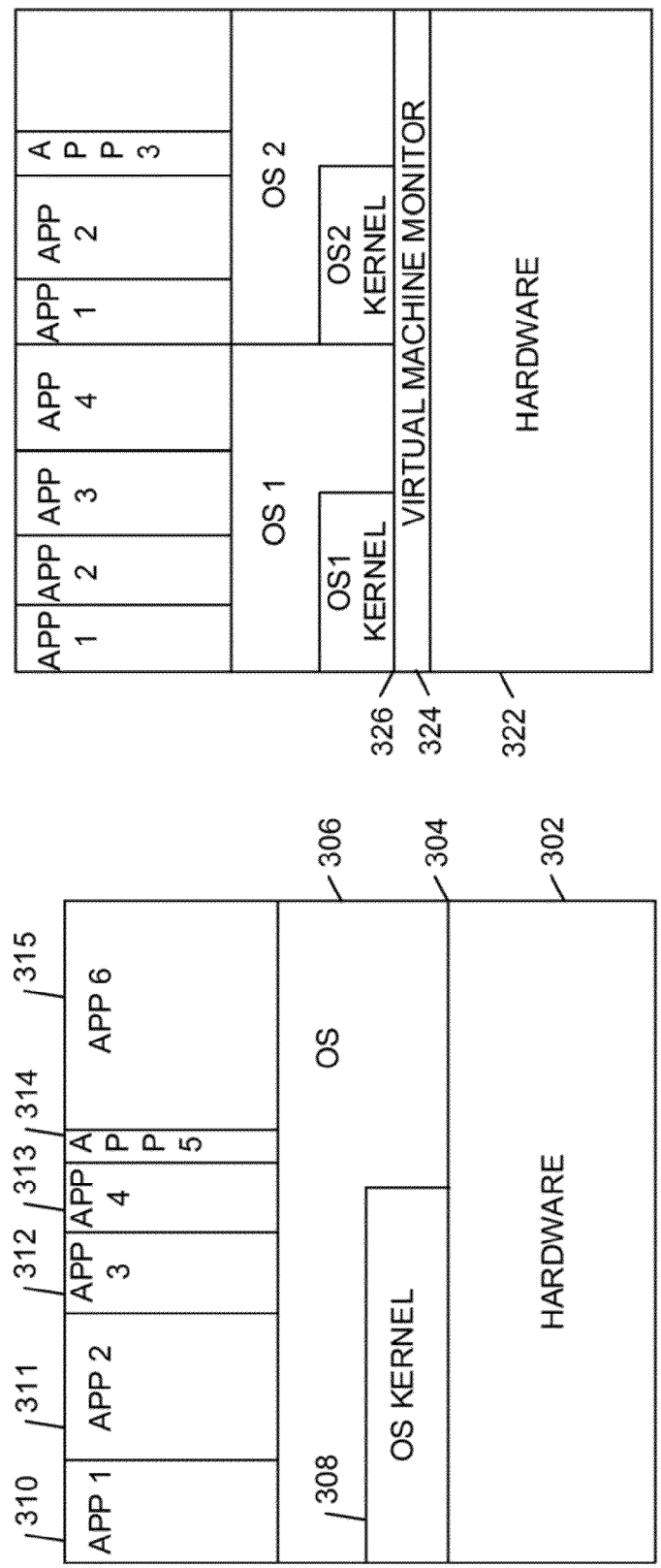
FIGS. 3A-B illustrate the concept of a virtual-machine monitor.

FIGS. 3A-B illustrate the concept of a virtual-machine monitor. FIG. 3A provides a simplified illustration of the layers of functionality within a traditional computer system. A first layer 302 is the physical computer hardware, and includes all of the various electrical, mechanical, and optical hardware components, including one or more processors, magnetic disk drives, various I/O controllers, internal busses, memory, and myriad other components and subcomponents of a computer system. The computer hardware provides a hardware interface 304 to various software programs and routines that execute on the computer system. In traditional computer systems, an operating system 306, including an operating system kernel 308, executes directly above the physical hardware, and provides a program-execution environment in which various application programs 310-315 concurrently execute. The illustration shown in FIG. 3A is imperfect, in that application programs do execute, in part, directly on the physical hardware, but application programs are permitted, by the operating system, to execute only a subset of the instructions provided by the processor and to access only a subset of the various other computational resources and features provided by the physical hardware layer. The hardware interface includes a set of non-privileged computer instructions, a set of privileged computer instructions, a set of non-privileged registers, a set of privileged registers, and a memory address space, often virtualized. In general, the operating system kernel 308 is given exclusive access to privileged instructions, privileged registers, and other privileged features and resources, so that access to these privileged instructions, registers, and other resources can be strictly controlled in order to prevent non-kernel operating system routines and application programs from intentionally or inadvertently affecting execution of other routines and application programs. The operating system provides a process context to multiple, concurrently executing processes, including a virtual memory address mapped dynamically to physical memory and a process state that is maintained for the process over the lifetime of the process. Each process executes largely independently of other processes within the execution context provided by the operating system.

FIG. 3B illustrates introduction of a virtual-machine monitor into a computer system. In FIG. 3B, the physical hardware layer 322 is identical to the physical hardware layer 302 in FIG. 3A. However, a new software entity, the virtual-machine monitor 324, or virtual machine, runs directly above the physical hardware layer, rather than the operating system. The virtual-machine monitor provides a virtual machine interface 326 to one or more operating systems that concurrently execute within the computer system. Each operating system executes as if it were the sole operating system in the computer system, executing directly at the physical machine interface. However, in reality, the operating system executes on a virtual machine interface provided to the operating system by the virtual-machine monitor.

Virtual-machine monitors have many uses. They were originally developed in order to allow more than one operating system to concurrently execute on a single computer system. Virtual-machine monitors are particularly useful for operating-system development and debugging. Operating-system errors that would normally result in a hard machine crash and the destruction of machine state instead, in a virtual machine environment, can be easily diagnosed and the operating system restarted without physically rebooting the computer system. The ability to execute multiple operating systems also provides huge advantages to computer centers that need to provide application services developed for different operating systems. Use of virtual-machine monitors can be used to isolate one application-program-execution environment from another, to prevent various types of problems that may arise from improperly implemented applications. A virtual-machine monitor can be used to simulate as-yet unimplemented machine architectures, to allow for simultaneous development of hardware and compatible operating systems.

There are a variety of different types of virtual machines and techniques for interposing virtual-machine monitors between physical hardware and operating systems. A virtual-machine monitor, often using specialized hardware assists, may trap attempts by an operating system to execute privileged instructions or access privileged registers, and emulate, on behalf of the operating system, the execution or access. Alternatively, a virtual-machine monitor may provide a physical-hardware-like programming interface that replaces privileged instructions and privileged resources with virtual-machine-monitor calls, thus requiring the operating system to be modified to invoke such calls, rather than attempting to directly execute privileged instructions or access privileged resources. In yet another technique, operating-system code may be statically or dynamically analyzed to detect use of privileged instructions and access to privileged resources, and those code sections can be replaced with instructions that efficiently trap to virtual-machine-monitor trap handlers. Various combinations of these techniques may be employed in hybrid implementations of virtual-machine monitors.

Figure 4:
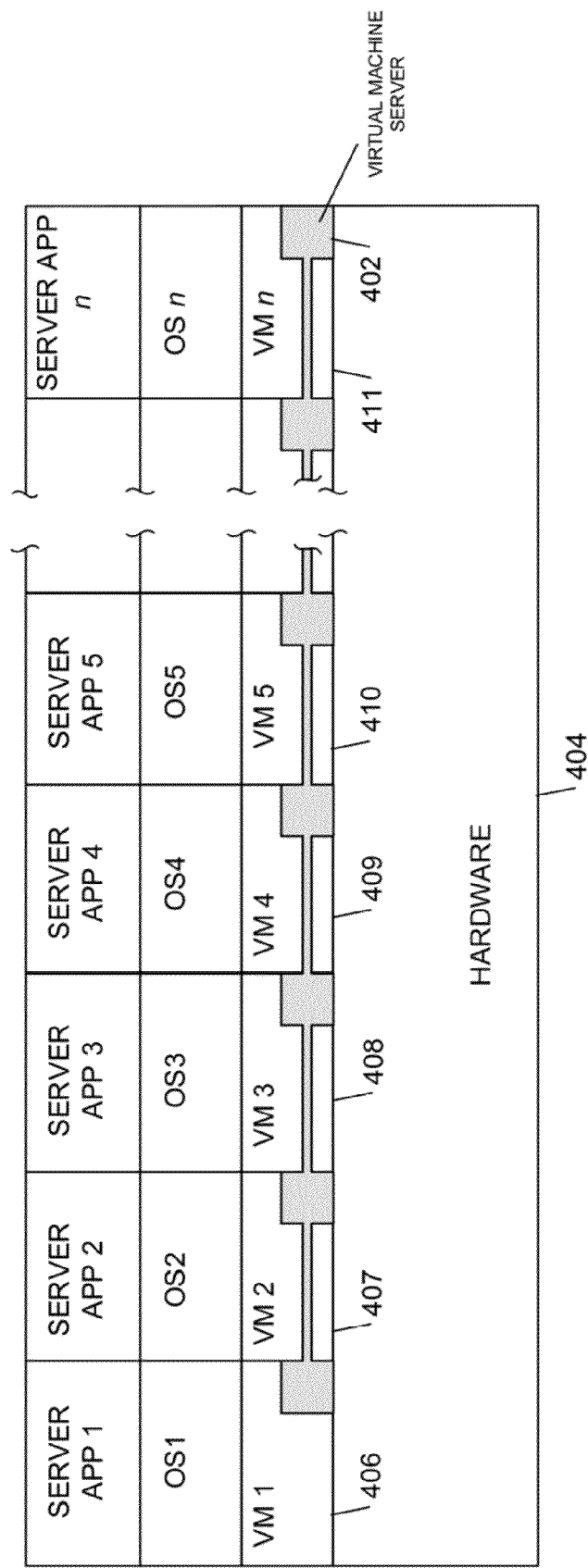
FIG. 4 illustrates a virtual-machine server.

FIG. 4 illustrates a virtual-machine server. As shown in FIG. 4, a virtual-machine server, represented in FIG. 4 by the shaded rectangles interconnected by short, shaded line segments, such as shaded rectangle 402, executes directly above the physical hardware layer 404. A virtual-machine server is generally a high-end, enterprise-level product that provides a platform for execution of multiple virtual machines 406-411. Although each virtual machine may be a fully functional virtual-machine monitor, it is often the case that each virtual machine is used to provide an execution environment for a single server application running above an operating system, as shown in FIG. 4. A virtual-machine server provides-many additional, useful features. A virtual monitor, along with the operating system, and applications executing above the virtual monitor, can be halted, moved from a virtual-machine server on one physical computer system to a virtual-machine server on a different physical computer system, and execution of the relocated virtual machine and operating system and application executing in the context of that virtual machine may then be resumed on the second physical computer system. In addition, virtual-machine service may provide for mobility of virtual machines among storage devices, high-availability virtual-machine execution, and automated load balancing of virtual-machine execution among nodes of a distributed computer system.

Figure 5:
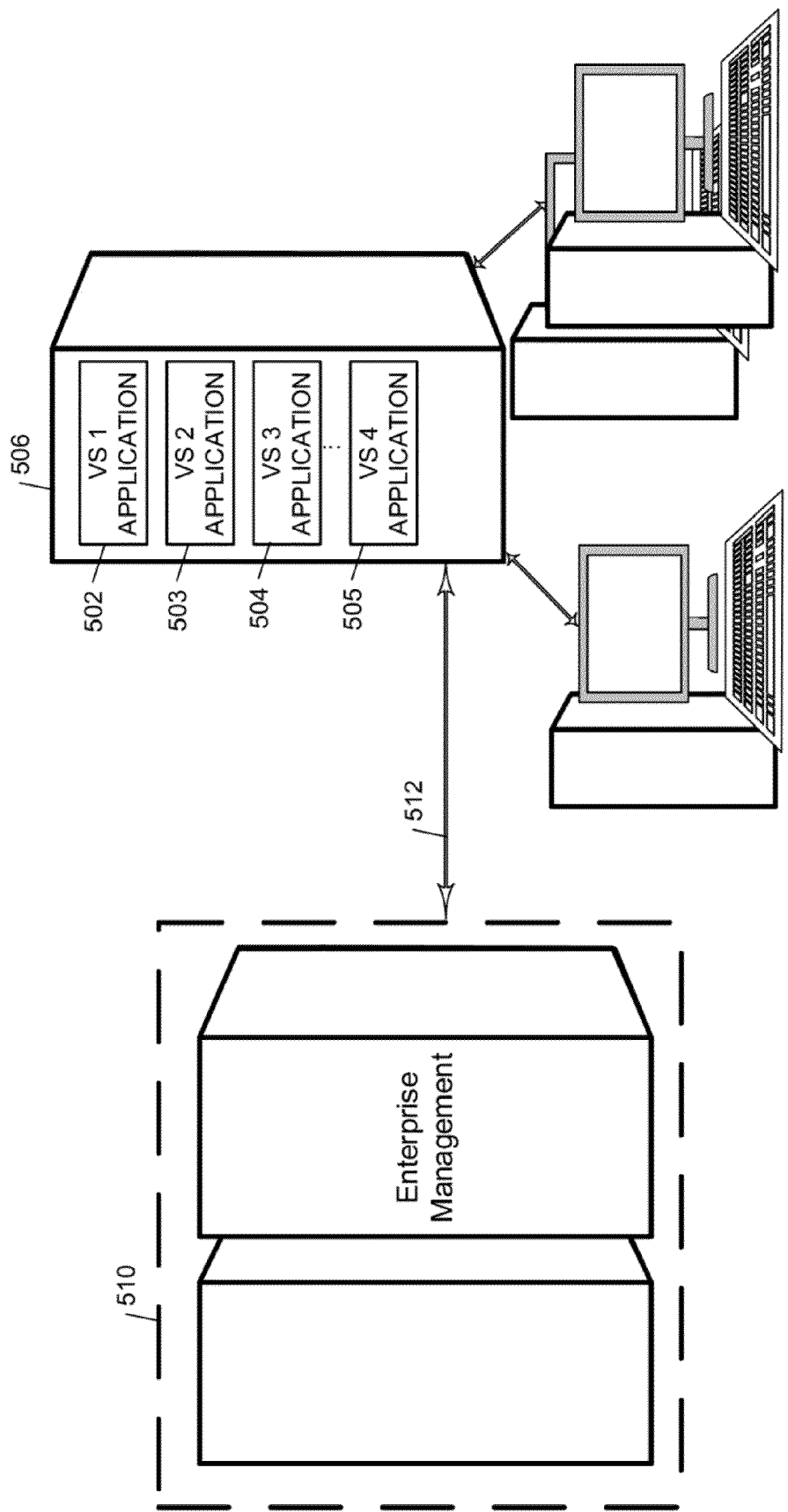
FIG. 5 illustrates a virtual-machine-based ASP model that represents one embodiment of the present invention.

Method and system embodiments of the present invention provide a new ASP model based on virtual-machine and virtual-machine-server technology. FIG. 5 illustrates, a virtual-machine-based ASP model that represents one embodiment of the present invention. FIG. 5 uses the same illustration conventions used in FIG. 2. In the traditional ASP model shown in FIG. 2, applications execute on physical hardware at an ASPC 202 while, according to embodiments of the present invention, as shown in FIG. 5, the applications instead execute within virtual machines 502-505 that execute above a virtual-machine server running on a physical ASP server 506 located at a remote SMBC site. There are many different possible implementations of the virtual-machine-based ASP model. In one embodiment of the present invention, the physical server 506 is provided to the SMBC by the ASP. Alternatively, the physical server 506 may be an SMBC server configured to run a virtual-machine server. The virtual-machine server and virtual machines that execute in the context of the virtual-machine server can, be managed and controlled, using additional enterprise-management software systems, from the ASPC 510. Thus, the WAN 512 or other communications link between the ASPC and the SMBC site is used for exchange of management information rather than for receiving and transmitting application-program data. Enterprise-management software that runs on the computer systems within the ASPC 510 interact with virtual machines just as the enterprise-management software would interact with physical computer systems running applications. Thus, by using virtual machines, few, if any, modifications are needed to be made to the enterprise management software. Use of virtual machines can be considered as a way to geographically extend the ASPC into remote client sites. The virtual-machine-based ASP model that represents an, embodiment of the present invention additionally addresses many of the security concerns associated with the traditional ASP model, described above with reference to FIG. 2. In the virtual-machine-based ASP model, SMBC data is less likely to be transmitted to the ASPC, instead remaining within the SMBC site. Potentially sensitive or confidential input or output data need only be transferred between client PCs and the ASP server 506 on which the virtual-machine server executes on behalf of the ASP via a LAN. The virtual-machine-server model for virtual-machine application execution provides additional isolation between executing applications that may further increase reliability and robustness of application execution.

The applications that run on the physical server 506 within the SMBC site can be distributed to the SMBC site in various different ways. In one embodiment of the present invention, an application can be stored as a disk image, from which the virtual-machine server can launch execution of the virtual machine and application. The disk images can be transmitted electronically from the ASPC to the SMBC server 506. Updates to application programs and new versions of application programs can be propagated to SMBCs via electronically distributed disk images. Alternatively, virtual machines may be launched within the ASPC, in the context of a virtual-machine server running within the ASPC, and then moved, using the virtual-machine movement features provided by virtual-machine servers, to the SMBC. Virtual machines can be monitored by the enterprise-management software running on the ASPC computers and, when problems are detected, can be reconfigured, terminated and restarted, and otherwise treated just as a physical server located within the SMBC.

Figure 6:
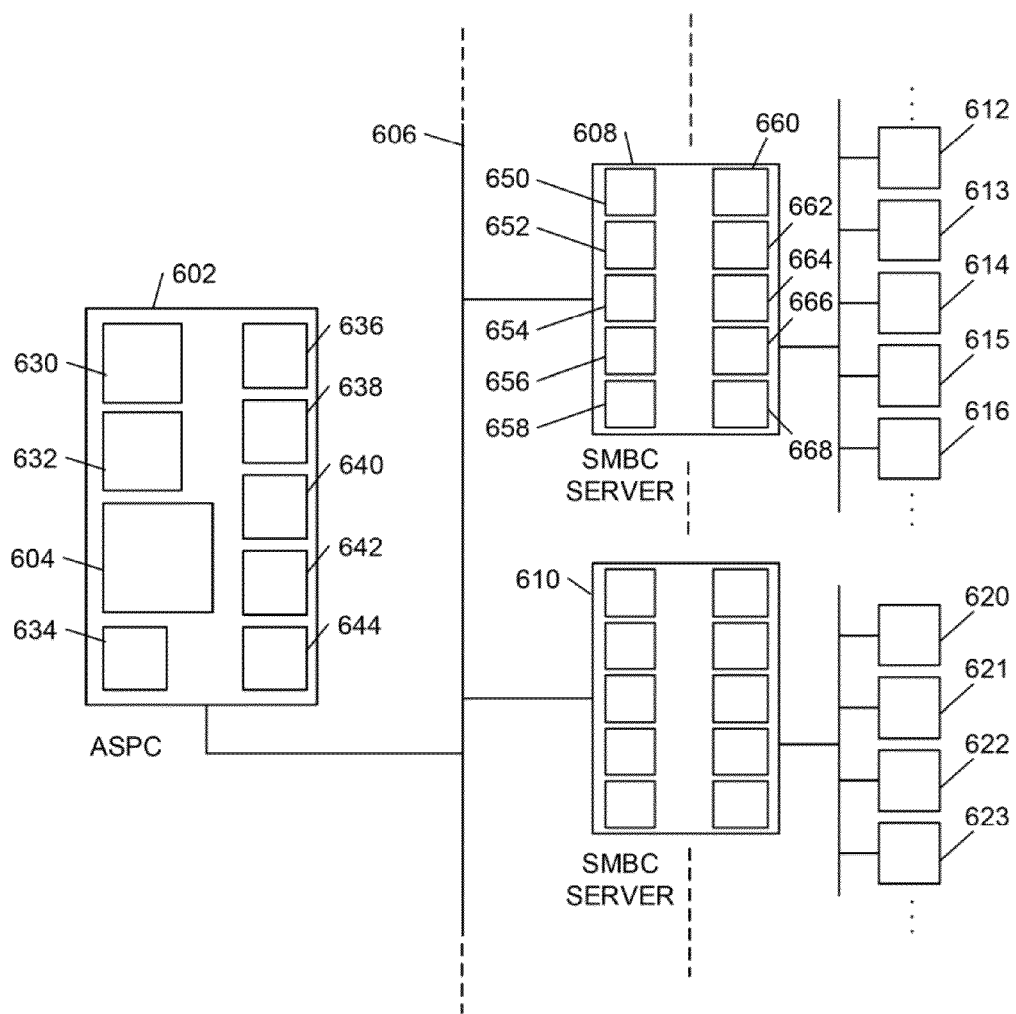
FIG. 6 illustrates a particular ASPC that represents one embodiment of the present invention.

FIG. 6 illustrates a particular ASPC that represents one embodiment of the present invention. As shown in FIG. 6, the ASPC 602 executes various back-end application servers and other utilities, including enterprise-management software 604, on ASPC computer systems. The ASPC computer systems electronically communicate, via a wide-area network 606, with ASP servers 608 and 610 located in two different SMBC sites. The ASP servers run a virtual-machine server that supports execution of a number of application programs in the contexts of a number of virtual machines on behalf of client computers 612-616 and 620-623 in the SMBC sites. In the embodiment of the present invention shown in FIG. 6, the ASPC computer system runs, in addition to the enterprise-management software 604, a robust data-backup application 630, a network-monitoring application 632, an intrusion-detection system 634, an Andrew-file-system server ("AFS Server") 636, a key-distribution-center ("KDC") server 638, a domain-name server 640, a lightweight directory access protocol ("LDAP") server 642, and a system log 644. Each ASP server within an SMBC site, such as server 608, runs a local LDAP server 650, a local KDC server 652, a, firewall 654, a local system logging facility 656, a proxy server 658, a dynamic host configuration protocol ("DHCP") server 660, a local domain-name server 662, an, electronic mail system 664, an SMB/CIFS networking protocol server 666, and a local AFS server 668.

The application servers running on the ASP servers within the SMBC sites interface to corresponding back-end servers running on the ASPC hardware. For example, the local LDAP server 650 may implement an LDAP subtree, or subdirectory, of a higher-level directory implemented by the LDAP server 642 executing within the ASPC. LDAP servers provide directory services that maintain hierarchical directories of essentially arbitrarily defined entries. For example, entries may represent personnel within an organization, and include information about each person in a formatted entry, including the person's phone number, email address, title, and other personnel information. LDAP servers provide for storing, searching, retrieving, deleting, and updating entries. AFS is a distributed networked file system providing efficient local caching of file-system objects. The SMB server implements the server-message-block application-level network protocol that provides distributed access to files, printers, serial ports, and other such resources as well as an authenticated inter-process communication mechanism. The DHCP server manages internet-protocol ("IP") addresses for various entities, including client computers, within an SMBC site. Intrusion-detection systems are designed to detect and frustrate malicious behaviors, including attempts to access, manipulate, or disable computers within a computer network. The KDC servers distribute encryption keys, used for a variety of security-based tasks. The APC may additionally provide virtual-private-network ("VPN") services, various electronic-mail services, including spam filtering, virus monitoring, and other such services, computer-network-authentication services, such as those provided by the KERBEROS protocol, and various business-specific applications, from billing systems to high-end database, computer-aided design, image processing, and other applications.

The virtual-machine-based ASP embodiments of the present invention provide numerous advantages to application-service providers. As discussed above, the computational overheads in a traditional-ASP-model system, apart from communications-associated overheads, are largely placed on the ASPC computational facilities. In the virtual-machine-based ASP embodiments of the present invention, computational overheads can be distributed between ASPC machines and SMBC machines. In addition to providing for distribution of computation, virtual-machine-based ASP embodiments of the present invention provide for distribution of hardware and software components between the ASPC and SMBCs, with certain components residing at the ASPC, other components residing at the SMBC, and certain components that migrate, via virtual-machine migration, back and forth between the ASPC and SMBCs, providing much greater flexibility in configuration, and dynamic configuration, of the virtual-machine-based ASPC/SMBC-application-execution system. Dynamic configuration can also be employed for dynamic re-configuration, in the event of component failures, to provide higher availability and fault tolerance in the virtual-machine-based ASPC/SMBC-application-execution system. As with the traditional ASP model, the virtual-machine-based ASP embodiments of the present invention allow for employing certain ASPC computing machines and other facilities and services among SMBCs, but, because of the use of virtual machines, sharing of ASPC resources can be carried out with far less risk of inadvertent or malicious interference in application execution on behalf of one SMBC by another SMBC. Virtual machines provide for resilient and effective isolation of the programs that execute above them. As discussed above, the virtual-machine-based ASP embodiments of the present invention provide a centralized and uniform management interface to ASPC facilities and their distributed counterparts executing remotely on virtual machines within SMBCs. A virtual-machine-based ASPC/SMBC-application-execution system can be managed by a single management interface, rather than, in a traditional-ASP-model system, separately managing components in each SMBC.

In many cases, the traditional-ASP-model does not provide adequate support and tools for certain types of management tasks and routines that an ASPC may need to execute. Often, communications networks are protected, at the SMBC side, by firewalls and other SMBC-specific security measures, which frustrate and can entirely prevent an application executing remotely, on the ASP, from determining configuration parameters of the SMBC system needed for various types of management tasks. Many types of components, including DHCP servers, generally need to run remotely, within SMBC internal networks, in order to properly operate. The virtual-machine-based ASP embodiments of the present invention overcome these issues by executing many tasks remotely, on SMBC facilities, rather than attempting to carry out the tasks by executing at the ASPC and communicating through a communications network with SMBC clients.

Figure 7:
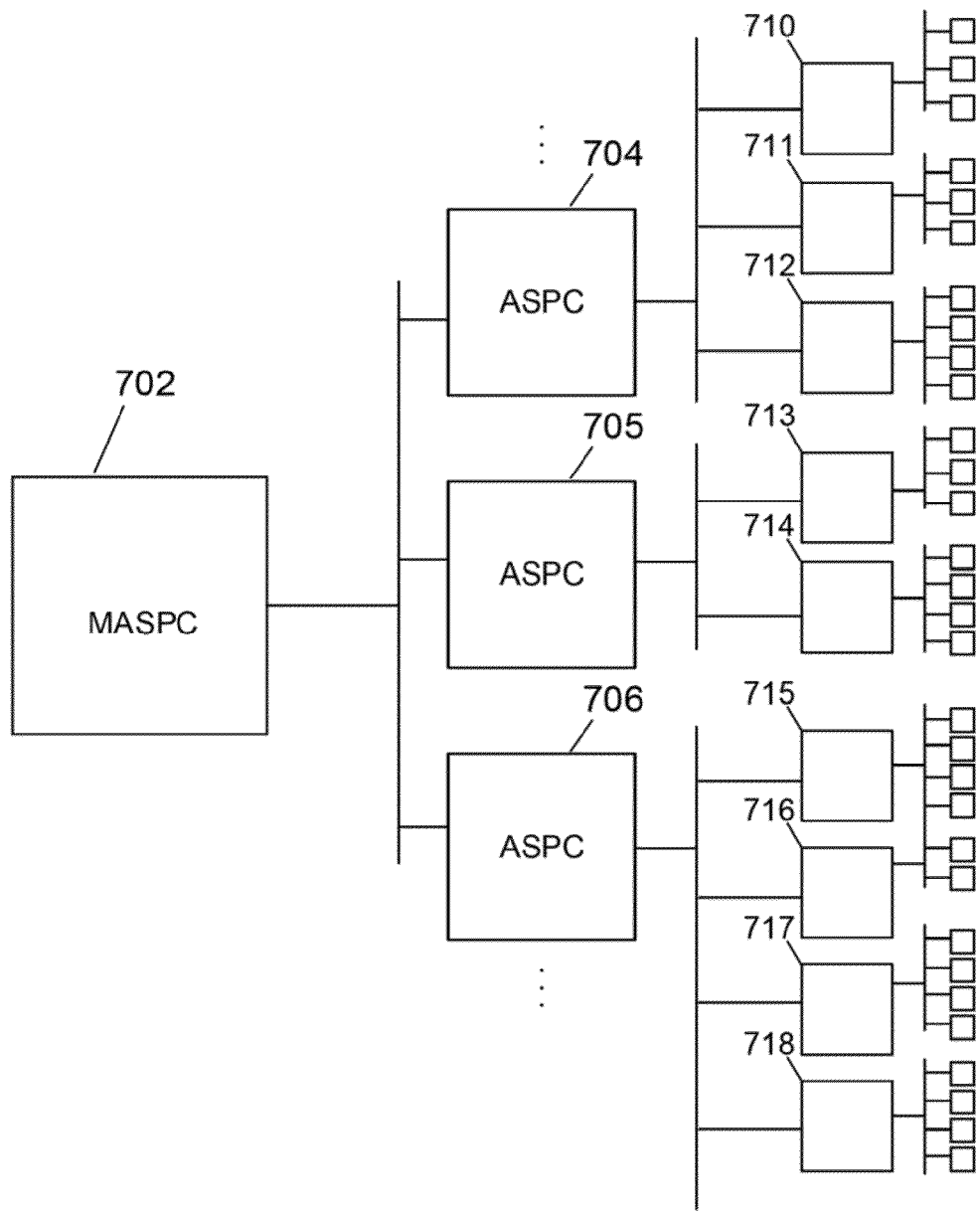
FIG. 7 illustrates an extension of the virtual-machine-based ASP model that represents one embodiment of the present invention.

FIG. 7 illustrates an extension of the virtual-machine-based ASP model that represents one embodiment of the present invention. In FIG. 7, meta ASPC ("MASPC") 702 manages multiple ASPCs 704-706, each of which, in turn, provides application services, through the virtual-machine-based ASP model, to multiple SMBC sites 710-718. The MASPC may use a virtual-machine model for implementing each of the ASPCs 704-706. In other words, virtualization is extended, by one level, to the MASPC. Thus, as one example, the various back-end application servers that execute within the ASPC shown in FIG. 6 may instead execute within virtual machines executing on a distributed computing system that supports a distributed virtual-machine server, all of which are managed from the MASPC. Extension of the virtual-machine-based ASP model may provide for relatively low-cost and easily implemented distribution of ASPCs in order to geographically collocate ASPCs near remote client sites and to provide geographical distribution of application-services provision to provide high levels of fault and catastrophe tolerance and high availability.

Figure 8:
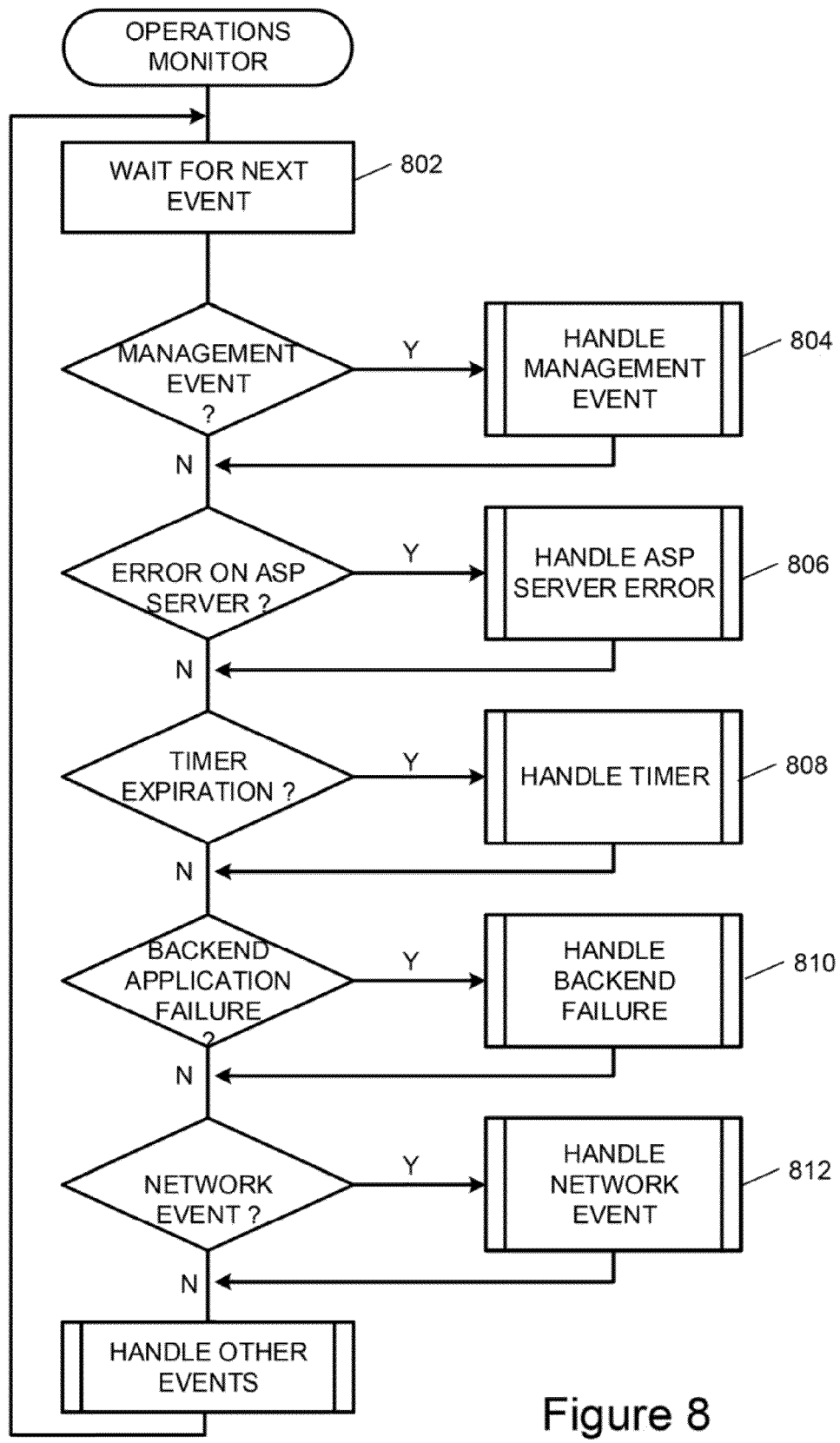
FIG. 8 provides a control-flow diagram for an operations monitor that represents one embodiment of the present invention.

The ASPC in a virtual-machine-based ASP model provides a management interface to ASPC personnel. Underlying that management interface is an operations monitor, implemented using existing enterprise-management utilities or developed to execute in parallel with, or at a higher hierarchical level than, the enterprise-management software, that provides an operations-monitor functionality that continuously monitors ASPC computing facilities as well as the ASP servers located at SMBC sites. FIG. 8 provides a control-flow diagram for an operations monitor that represents one embodiment of the present invention. The operations monitor can be considered to be a continuously executing event handler which waits, in step 802, for a next event to occur, and then, once an event has occurred, handles that event and any other events that may occur during event handling. Various types of events may be partitioned into classes of events, each handled by a high-level handler which, in turn, invokes more specific event handlers. Events may include management events, handled by a management-event handler 804, ASP-server events, handled by an ASP-server-event handler 806, timer-expiration events, handled by a timer handler 808, back-end application-service failures, handled by a back-end-failure handler 810, and network-events handled by a network-event handler 812. Many events may be handled automatically by the operations monitor. For example, the operations monitor may set timers in order to carry out periodic testing of various ASPC and SMBC-site functionality, in a purely automated fashion. Many types of events may be handled by reconfiguring or restarting virtual machines. Certain types of events may require system-manager intervention, elicited through a management interface provided on an ASPC console or other interactive device.

The virtual-machine-based ASP model of the present invention may be additionally extended to provide application services to individual computers, including home computers. Virtual-machine monitors have been developed for many of these computers, providing a virtual-machine platform that can be exploited by an ASP for executing applications on individual computers on behalf of computer user's.

Figure 9:
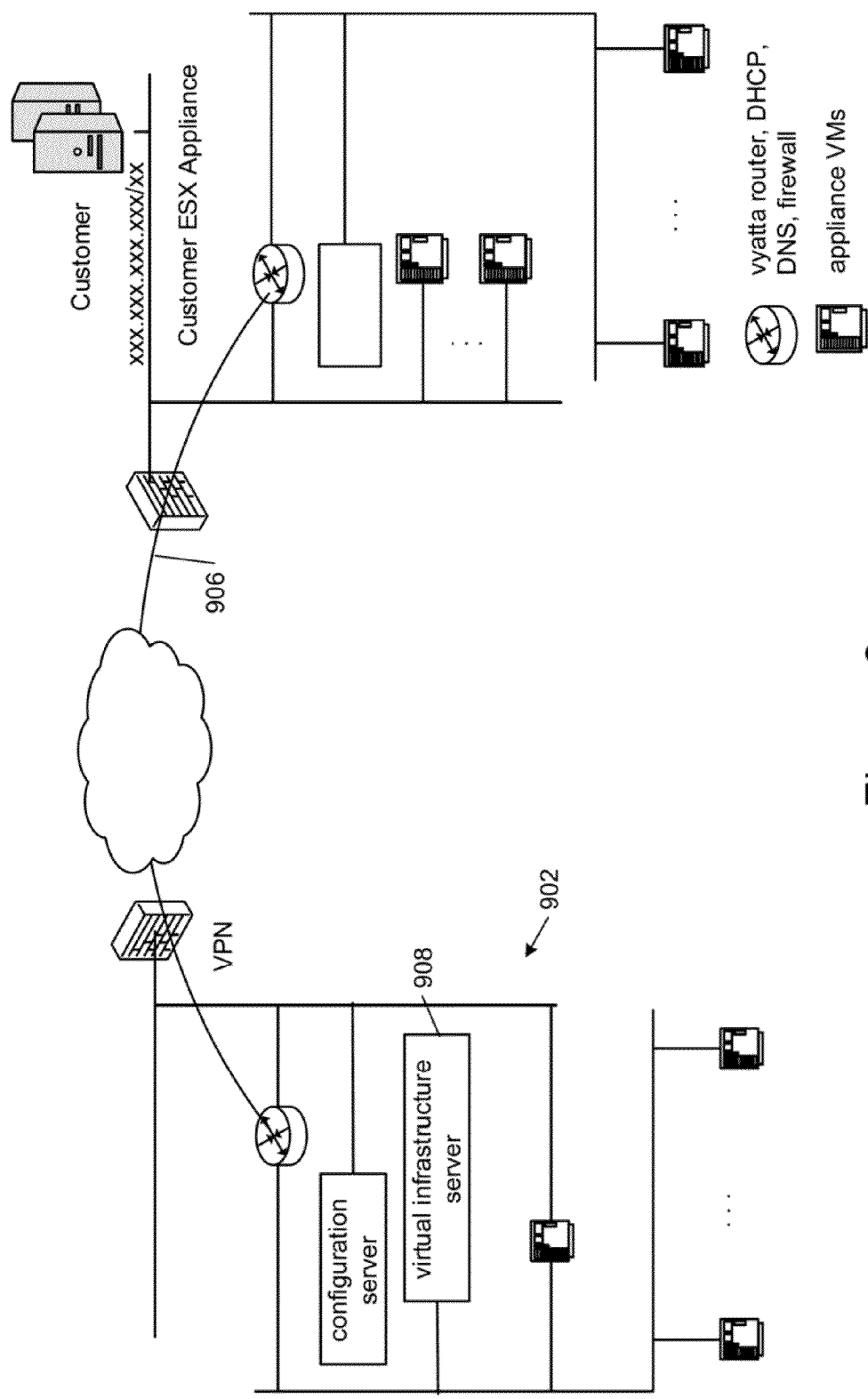
FIG. 9 illustrates an exemplary virtual-machine-based ASP system that represents one embodiment of the present invention.

FIG. 9 illustrates an exemplary virtual-machine-based ASP system that represents one embodiment of the present invention. The ASPC 902 is interconnected with an SMBC 904 via a VPN tunnel 906. A VMware® virtual infrastructure server 908 running on an ASPC computer system manages a data-center comprising multiple remote VMware ESX servers and the virtual machines executing on them. The remote VMware ESX servers are connected with the virtual infrastructure server through internal networks and VPN tunnels, so that the virtual infrastructure server and ESX servers operate as if they were all collocated within a physical data center.

Although the present invention has been described in terms of particular embodiments, it is not intended that the invention be limited to these embodiments. Modifications will be apparent to those skilled in the art. For example, a virtual-machine-based ASP may provide any number of different application services to remote clients. Any number of different virtual-machine servers can be used to implement ASP servers installed at remote sites, with the virtual-machine servers running on any number of different physical hardware servers and other computational systems. Management interfaces, event-monitoring systems, and ASP-server management systems may be implemented using any number of different programming languages for execution on any number of different physical hardware systems. Additional types of high-bandwidth electronic communications media, rather than wide-area networks, can be used to interconnect ASPC computational facilities with remote ASPC servers at SMBC sites.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A virtual-machine-based application-services-provision system comprising:
   an application services provision center (ASPC) comprising one or more physical computational facilities configured to communicate with one or more physical remote client site servers, wherein each of the remote client site servers is located at a respective remote client site and executes a respective virtual machine server within the context of which the remote client site server executes one or more respective virtual machines in each of which the remote client site server runs a respective application on behalf of one or more clients that are located at the respective remote client site and are configured to communicate with the respective remote client site server;

wherein the ASPC executes an enterprise management program that manages each of the virtual machine servers and the one or more respective virtual machines that run in the context of the virtual machine server and, based on execution of the enterprise management program, the ASPC is configured to migrate a respective one of the virtual machines and its respective application between respective ones of the remote client site servers and migrate a respective one of the virtual machines and its respective application from a respective one of the remote client site servers to the ASPC, wherein the APSC is configured to execute one or more back-end applications, the one or more remote client site servers execute one or more front-end versions of the back-end applications, and the one or more back-end applications interface with the one or more front-end versions to distribute computational overhead between the ASPC and the one or more remote client site servers.

2. The virtual-machine-based application-services-provision system of claim 1 wherein one or more of the virtual machines is migratable from the ASPC to the remote client site and from the client site to the ASPC.

3. The virtual-machine-based application-services-provision system of claim 1 wherein on behalf of a client at the remote client site, an application executes solely on an ASPC computer system, solely on the remote client site server, or, in a distributed fashion on both the ASPC computer system and the remote client site server.

4. The virtual-machine-based application-services-provision system of claim 1 wherein back-end applications executed on behalf of clients by the virtual-machine-based application-services-provision system on one or more ASPC computer systems include:
a lightweight directory access protocol back-end server;
an Andrew-file-system back-end server;
a data-backup application;
an intrusion-detection system;
a key-distribution-center back-end server; and
a system log.

5. The virtual-machine-based application-services-provision system of claim 1 wherein applications executed on behalf of clients by the one or more remote client site servers include:
a local lightweight directory access protocol server;
a local Andrew-file-system server;
a data-backup application;
an intrusion-detection system;
a dynamic host configuration protocol server;
a local domain-name server;
a firewall;
an electronic mail system;
a proxy server;
a networking protocol server;
a local key-distribution-center server; and
a local system log.

6. The virtual-machine-based application-services-provision system of claim 1 wherein the computational facilities within the ASPC are connected with the virtual machine server at the remote client site by a Virtual Private Network (VPN) tunnel.

7. The virtual-machine-based application-services-provision system of claim 1 wherein the virtual machine server at the remote client site is a remote physical server.

8. The virtual-machine-based application-services-provision system of claim 1 wherein the computational facilities within the ASPC run a virtual infrastructure server that manages a datacenter comprising multiple remote physical servers and the virtual machines executing on them.

9. The virtual-machine-based application-services-provision system of claim 1 wherein the remote client site servers are connected with a virtual infrastructure server of the ASPC through internal networks and (Virtual Private Network) VPN tunnels, so that the virtual infrastructure server and remote client site servers operate as if they were all collocated within a physical data center.

10. A remote extension of an application-services-provider center (ASPC) comprising:
a remote client site server comprising one or more processors that execute a virtual machine server at a remote client site wherein the virtual machine server configured to be controlled by an enterprise-management program that is executed within the ASPC;
virtual machines that execute at the remote client site in an execution environment provided by the virtual machine server, wherein the virtual machine server and the virtual machines are configured to be controlled by the enterprise-management program; and
application programs that execute in an execution environment provided by the virtual machines, wherein the application programs comprise one or more front-end versions of one or more back-end applications that execute with the ASPC, and the one or more back-end applications are configured to interface with the one or more front-end versions to distribute computational overhead between the ASPC and the remote client site server;
wherein, responsive to the enterprise-management program,
a respective one of the virtual machines and its respective application are migratable from the remote client site server to the ASPC, and
a respective one of the virtual machines and its respective application are migratable from the remote client site server to an execution environment provided by a virtual machine server on a remote client site server at a another remote client site controlled by the enterprise-management program.

11. The remote extension of an application-services-provider center of claim 10 wherein one or more of the virtual machines is migratable from the ASPC to the remote client site and from the remote client site to the ASPC.

12. The remote extension of an application-services-provider center of claim 10 wherein on behalf of a client at the remote client site, an
application executes, solely on an ASPC computer system, solely on the remote client server, or, in a distributed fashion, on both the ASPC computer system and the remote client site server.

13. The remote extension of an application-services-provider center of claim 10 wherein back-end applications executed on behalf of clients by the virtual-machine-based application-services-provision system on one or more ASPC computer systems include:
a lightweight directory access protocol back-end server;
an Andrew-file-system back-end server;
a data-backup application;
an intrusion-detection system;
a key-distribution-center back-end server; and
a system log.

14. The remote extension of an application-services-provider center of claim 10 wherein applications executed on behalf of clients by the remote client site server include:

a local lightweight directory access protocol server;
a local Andrew-file-system server;
a data-backup application;
an intrusion-detection system;
a dynamic host configuration protocol server;
a local domain-name server;
a firewall;
an electronic mail system;
a proxy server;
a networking protocol server;
a local key-distribution-center server; and
a local system log.

15. The virtual-machine-based application-services-provision system of claim 1 wherein the enterprise-management program is executed by computational facilities within the ASPC and manages the one or more applications executed by the one or more virtual machines executed by virtual machine server at the remote client site as if the applications were executing within the ASPC.

* * * * *

UNITED STATES PATENT AND TRADEMARK OFFICE
CERTIFICATE OF CORRECTION

PATENT NO. : 8,763,005 B2  Page 1 of 1
APPLICATION NO. : 13/259590
DATED : June 24, 2014
INVENTOR(S) : Carl Staelin et al.

It is certified that error appears in the above-identified patent and that said Letters Patent is hereby corrected as shown below:

In the Claims

In column 11, line 11, in Claim 1, delete "ASPC," and insert -- ASPC; --, therefor.

In column 11, line 12, in Claim 1, delete "APSC" and insert -- ASPC --, therefor.

In column 12, line 15, in Claim 10, delete "site" and insert -- site, --, therefor.

Signed and Sealed this
Tenth Day of March, 2015

Michelle K. Lee
*Deputy Director of the United States Patent and Trademark Office*